United States Patent [19]

Roecker

[11] Patent Number: 5,604,683
[45] Date of Patent: Feb. 18, 1997

[54] EVALUATING TARGET TRACKING WHEN USING MULTIPLE SENSORS

[75] Inventor: James A. Roecker, Boulder, Colo.

[73] Assignee: Lockheed Martin Corporation, Bethesda, Md.

[21] Appl. No.: 758,014

[22] Filed: Sep. 12, 1991

[51] Int. Cl.$^6$ .................................................. G01S 11/04
[52] U.S. Cl. .......................... 364/516; 342/378; 342/450; 342/465
[58] Field of Search .................................. 364/516, 517; 342/53, 56, 189, 450, 126, 147, 148, 378, 416, 465

[56] References Cited

U.S. PATENT DOCUMENTS

| | | | |
|---|---|---|---|
| 4,633,261 | 12/1986 | Kosaka et al. | 364/517 X |
| 4,914,604 | 4/1990 | Castelaz | 364/517 |
| 5,107,271 | 4/1992 | White | 364/517 X |
| 5,128,684 | 7/1992 | Brown | 364/516 X |

Primary Examiner—Ellis B. Ramirez
Assistant Examiner—Edward Pipala
Attorney, Agent, or Firm—Carl M. Wright; Mark A. Wurm

[57] ABSTRACT

Measuring the difference in dihedral angles formed by planes defined by a pair of passive sensors, a target, and a reference plane to determine whether both sensors are tracking the same target. The reference plane is defined by the positions of the two sensors and the origin of the system's reference coordinates. A sensor-target plane is determined by the sensor's position, the position of the other sensor, and the position of its target. If the target is the same for both sensors, the sensor-target planes will be substantially the same and their dihedral angles formed with the reference plane will be substantially equal. If the target is not the same for both sensors, then a statistic relating to the dihedral angles with the reference plane will be significant. A decision based on the dihedral angle statistic and a statistic derived from the tracking predictor, e.g., the Kalman Filter Residual, can be made whether the target is maneuvering, has been lost, is correctly tracked.

9 Claims, 2 Drawing Sheets

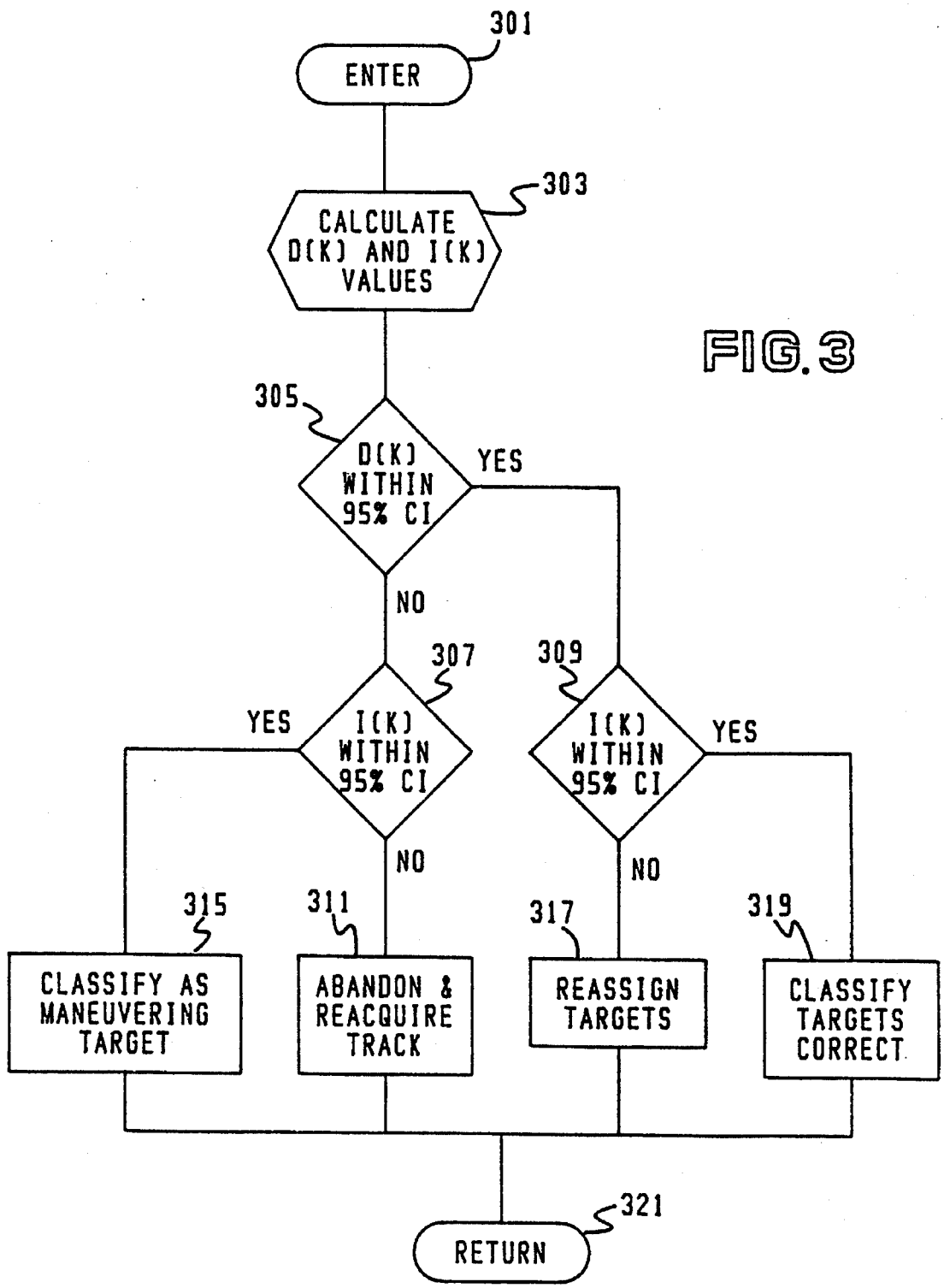

EVALUATING TARGET TRACKING WHEN USING MULTIPLE SENSORS

BACKGROUND AND SUMMARY OF THE INVENTION

The invention relates to the application of computers to the solution of target tracking problems, in particular sensing and following a target using radiant energy, where the tracking signals are processed to assess the probable accuracy of the tracking. More particularly, it solves the fundamental track monitoring problem of deciding whether a poor track is due to track loss or target maneuver.

Tracking targets in three-dimensional space using passive sensors, e.g., infrared sensors, requires at least two sensors separated along a base line to acquire range information. The target sensors supply elevation and azimuth information about detected targets but the information signals are contaminated by noise and clutter. Tracking multiple targets increases the complexity of the problem.

Poor tracking results can be caused by unrealized target maneuvering, by one sensor tracking a target different from the target being tracked by the other sensor, or by accumulated errors in one or both sensors.

An example of a tracking algorithm is the well known Kalman Filter Equation which estimates a state vector, X, by $$X(k|k) = \phi X(k-1|k-1) + K(k)\{H\phi X(k-1|k-1) - z(k)\}$$

where the quantity in braces is a residual vector, r, the difference between the predicted position and the measured position. The value of r is considered to be NID (normally and independently distributed). The equation predicts a next position, indicated by the index k, from a previous position, indicated by the index k−1, based on historical information about the target track.

Track monitoring can use a value derived from the Kalman Filter Equation, $$d(k) = \alpha d(k-1) + r^T s^{-1} r$$

where
$0 < \alpha \leq 1$,
r is the residual vector,
$r^T$ is the transpose of r,
s is the covariance matrix of r (calculated in the Kalman Gain Equation), and
$s^{-1}$ is the inverse matrix of s.

The value of d(k) is distributed as a chi-square random variable with $n(1+\alpha)/(1-\alpha)$ degrees of freedom where n is the number of measurement components. When d(k) exceeds a threshold value, e.g., a 95% confidence interval, the tracking may be considered to be poor.

Whether poor tracking is caused by target maneuvering or track loss cannot be accurately or readily determined from the value of d(k) alone. The invention supplies an additional statistic or parameter to evaluate tracking success more accurately and definitively.

Prior art techniques for dealing with the errors that can occur are slow or tend to explode in size (such as tracking all possible positions of an uncertain target), both of which overload the processing system executing the tracking algorithm. Some prior art methods use only d(k). Some use Bayesian probabilities. Others use procedures requiring extensive computer time.

U.S. Pat. No. 4,914,604 discloses a neural network analog associative processor that analyzes a plurality of angles from a plurality of sensors (at least three) forming multiple possible intersections representing targets. The processor comprises a multilayer substrate forming an analog of the actual sensors' physical positions. False targets (ghosts) are identified and eliminated by counting pulses, one from each intersect, from the other intersects until the number of remaining intersects equals the total number of targets.

U.S. Pat. No. 4,529,316 discloses a method of identifying a false data point representing an erroneous depth location. A projector directs light onto a point on a surface. The light is reflected from the surface to two sensors and the 3-dimensional position of the point is computed by conventional techniques from the known locations of the sensors and projector. The calculated position from each sensor is compared. If they differ significantly, the computed position is determined to be false.

U.S. Pat. No. 4,326,259 shows a perceptron-like device for identifying targets from multiple input sources by dividing space into two or more regions by constructing lines, planes, or hyperplanes. The space is divided by adapting the device to recognize different classes of events.

U.S. Pat. No. 4,333,077 discloses a means to determine whether a radar surveillance unit and an optical tracking unit are pointed in the same direction using a phase comparator responsive to the position indicator of each unit.

U.S. Pat. No. 2,404,243 discloses the use of directional microphones to coordinate a plurality of tracking or other devices on a common point such as search lights or guns on a target aircraft. It shows an electromechanical apparatus based on a scale model for making the calculations.

U.S. Pat. No. 3,445,847 shows an apparatus for performing trigonometric functions to make geometrical determinations of one or more points.

U.S. Pat. No. 3,754,249 shows the combination of a television camera and laser beam to lock onto a target for guiding a missile to the target.

U.S. Pat. No. 4,622,458 teaches the use of several independent track control stations coupled to a central station and operating in real time to track moving targets and evaluate trajectories.

Reference may be made to "Trajectory Plotting by Triangulation in Passive Sonar" (INSPEC Abstract Number B88022225) by J. Durif and L. Kopp for a discussion of optimal tracks association testing to match tracks where two sensors are tracking multiple targets using triangulation.

None of the prior art patents or literature shows or suggests the use of the criteria of the invention. The criteria used in the prior art do not provide as good a decision parameter and require more computer time for computation.

According to the invention, a method of evaluating the tracking of a maneuvering target using at least two sensors stores the target data received from each sensor and predicts a target position using the data. Next, a track quality statistic is derived from the stored target data and an inclination angle statistic is determined from the same data. Whether a target track is acceptable is evaluated based on the track quality statistic and the inclination angle statistic.

BRIEF DESCRIPTION OF THE DRAWINGS

The invention is described in detail by referring to the various figures which illustrate specific embodiments of the invention and wherein like numerals refer to like elements.

FIG. 3 is a flowchart describing the sequence of operations according to the invention.

DESCRIPTION OF THE PREFERRED EMBODIMENT

The invention employs a fast and efficient technique to detect whether tracking errors are due to tracking different targets or to target maneuvers and to improve the decision process for determining tracking success. The technique of the invention is to measure the difference between the dihedral angles formed by each sensor-target plane and a reference plane. (Planes must be defined by three points.) The reference plane is defined by the positions of the two sensors and the origin of the system's reference coordinates, e.g., the center of the earth. A sensor-target plane is determined by the sensor's own position, the position of the other sensor, and the position df its target.

If the target is the same for both sensors, the sensor-target planes will be the same and their dihedral angles formed with the reference plane will be the same within some small measurement error. If the target is not the same for both sensors, then their dihedral angles with the reference plane will be different and the difference will increase with time.

Alternately, the dihedral-angle between the two sensor-target planes can be used since it represents the same value as the difference between the dihedral angles each sensor-target plane makes with the reference plane. The reference plane, however, is usually already available.

Monitoring the difference between the dihedral angles, represented by $\beta$, the value $$i(k)=\alpha i(k-1)+(\beta/\sigma_\beta)^2$$

where
$0<\alpha\leq 1$, and
$\sigma_\beta$ the standard deviation of $\beta$,
provides a chi-square distributed variable having $(1+\alpha)/(1-\alpha)$ degrees of freedom that can be evaluated against a 95% confidence interval.

A better decision can be made on the validity of the track using both d(k) and i(k) as follows:

| d(k) | i(k) | Decision |
|---|---|---|
| not acceptable | not acceptable | Abandon track & reacquire |
| acceptable | not acceptable | Reassign targets |
| not acceptable | acceptable | Object has maneuvered |
| acceptable | acceptable | Track considered correct |

(Acceptable means the computed statistic falls within a 95% confidence interval or other predetermined criteria range.)

Figure 1:
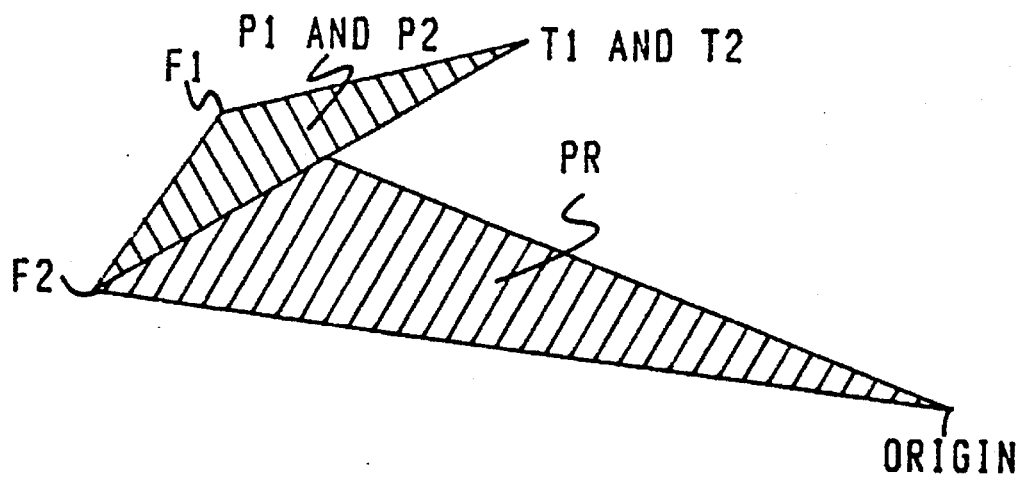
FIG. 1 is an illustration of the planes formed in accordance with the invention when both sensors are tracking the same target.

FIG. 1 illustrates the condition when both sensors are tracking the same target. Planes P1 and P2 are the same since the target T1 for sensor F1 and the target T2 for sensor F2 coincide. A reference plane PR is defined by the sensors F1 and F2 and the origin. The mathematics of defining the planes by three points are well known vector analysis procedures. Since the planes P1 and P2 coincide, the difference in the dihedral angle they form with the reference plane PR is substantially zero, indicating the coincidence of the targets T1 and T2, i.e., the target T1 is the same as the target T2.

Figure 2:
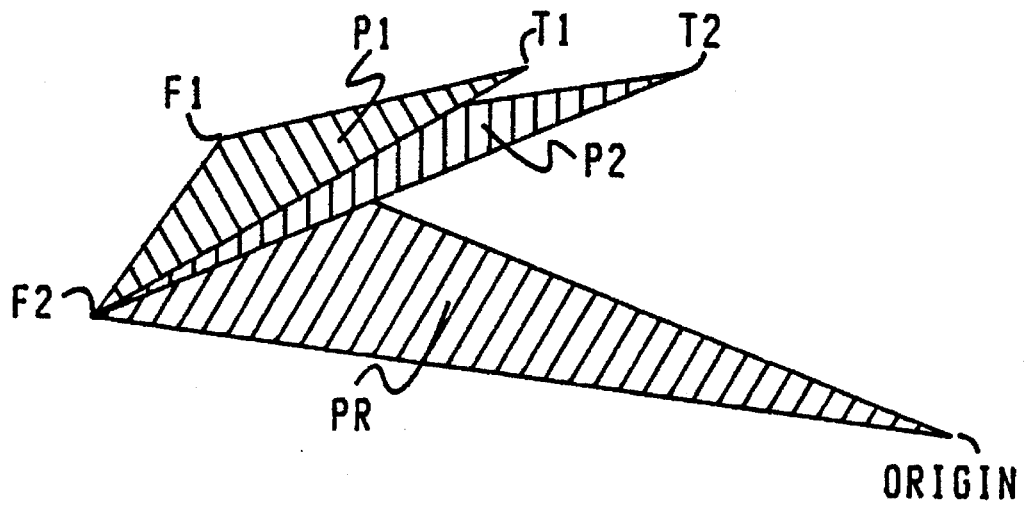
FIG. 2 is an illustration of the planes formed by the sensors when each sensor is tracking a different target.

FIG. 2 illustrates the condition when each sensor is tracking a different target. In the figure, the sensor F1 is tracking target T1 and the sensor F2 is tracking target T2. The plane P1 defined by the points F1, F2, and T1 is different from the plane P2 which is defined by the points F1, F2, and T2. Therefore, the difference in the dihedral angles formed with the reference plane PR is not substantially zero, indicating the sensors are probably tracking different targets.

In the following description, references are made to a flowchart depicting the sequence of operations performed by the invention. The symbols used are standard flowchart symbols accepted by the American National Standards Institute and the International Standards Organization. In the explanation, an operation may be described as being performed by a particular block in the flowchart. This is to be interpreted as meaning that the operations referred to are performed by programming and executing a sequence of instructions that produces the result said to be performed by the described block. The actual instructions used depend on the particular hardware used to implement the invention. Different processors have different instruction sets but persons of ordinary skill in the art are familiar with the instruction sets with which they work and can implement the operations set forth in the blocks of the flowchart.

The invention is described below as incorporated as a subroutine. Subroutines are computer program modules that are not placed directly in the stream of instructions in which they are used. Subroutines are invoked by call and link procedures which cause the program execution to transfer to the sequence of computer instructions comprising the subroutine program and to link or to supply the operands used by the subroutine. When a subroutine has completed execution, the program control returns to the instruction in the calling program following that which called the subroutine.

Certain calculations need be made only once. For example, in the following process, the reference plane is considered to have been already computed and that it does not change. It is also presumed that the data for the calculations have already been gathered and is available.

FIG. 3 shows the process according to the invention as a flowchart of a subroutine. The subroutine is entered at a terminal block 301. The values of d(k) and i(k) are calculated by a procedure block 303 as described above.

A triplet of decision blocks 305, 307, and 309 determine the action to be taken based on the values of d(k) and i(k). If neither value is within a 95% confidence interval, then at a process block 311 the system is flagged to abandon the present tracks and to reacquire new tracks. The subroutine is then exited by a terminal block 321.

If the value of d(k) is not within a 95% confidence interval but the value of i(k) is, a process block 315 flags the system that the target is considered to be maneuvering.

If the value of d(k) is within a 95% confidence interval but the value of i(k) is outside its 95% confidence interval, then the system is flagged to reassign targets by a process block 317.

If both values d(k) and i(k) are within their 95% confidence interval, then a process block 319 flags the system that the targets are considered correct.

The flag mechanism can be two binary digits set by the process block 311 as 00, by the process block 315 as 01, by the process block 317 as 10, and by the process block 319 as 11.

The parameters have included 95% confidence intervals but it is possible to use higher or lower confidence intervals, or other criteria, depending on the degree of certainty to be attained and the nature of the criteria.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. A method of evaluating the tracking of a maneuvering target using at least two passive sensors relatively spaced comprising the steps of:

storing target data received from each passive sensor;

predicting a target position from stored target data;

deriving a track quality statistic from stored target data;

determining an inclination angle statistic from stored target data; and evaluating whether a target track is maneuvering based on said track quality statistic and said inclination angle statistic.

2. The method claimed in claim 1 wherein said track quality statistic is the residual difference between data stored to update a target track and the predicted target position.

3. The method claimed in claim 1 where the inclination angle statistic is based on the dihedral angles between planes formed by a pair of said passive sensors, an origin, and a target being tracked.

4. The method claimed in claim 1 wherein said evaluating step includes the steps of:

classifying the target track as acceptable if said track quality statistic is acceptable and said inclination angle statistic is acceptable;

classifying the target track as a target maneuver if said track quality statistic is not acceptable and said inclination angle statistic is acceptable;

classifying the target track as unacceptable for sensors tracking different targets if said track quality statistic is acceptable and said inclination angle statistic is not acceptable; and classifying the target track as lost if said track quality statistic is not acceptable and said inclination angle statistic is not acceptable.

5. A method comprising the steps of:

predicting present positions of first and second targets based on data obtained therefrom by first and second sensors, respectively;

deriving a statistic representative of the likelihood of the correctness of the predicted present positions;

defining a first plane determined by the locations of the first and second sensors and the predicted position of the first target;

defining a second plane determined by the locations of the first and second sensors and the predicted position of the second target;

calculating a dihedral angle formed by said first and second planes; and determining from the statistic and dihedral angle a classification of the first and second targets.

6. The method of claim 5 including a first step of:

obtaining elevation and azimuth data of at least first and second targets being tracked by at least a first and second passive sensors, respectively.

7. The method of claim 5 in which said determining step includes the steps of:

classifying said first and second target as the same target if the statistic and dihedral angle are within predetermined ranges of values, respectively;

classifying the first and second target to be the same target and maneuvering if said statistic is not within a predetermined range of values and said dihedral angle is within a predetermined range of values;

classifying the first and second target as different targets if said statistic is within a predetermined range of values and said dihedral angle is not within a predetermined range of values; and classifying the first and second targets as incorrect targets if both the statistic and dihedral angle are outside a predetermined range of values.

8. The method of claim 5 wherein the calculating step includes the steps of:

defining a reference plane determined by the locations of the first and second sensors and an origin;

computing a first dihedral angle formed by the first plane and the reference plane;

computing a second dihedral angle formed by the second plane and the reference plane; and deriving the dihedral angle between said first and second planes as the difference between the first and second dihedral angles.

9. In a system for tracking targets from at least two passive sensors relatively spaced, the method comprising the steps of:

determining at least two planes each plane being defined by the location of one sensor, a target associated with the sensor, and the location of the other sensor; and qualifying said targets as the same target if said planes are the same and as separate targets if the planes are not the same.

* * * * *